United States Patent
Liu et al.

(10) Patent No.: US 7,100,043 B2
(45) Date of Patent: Aug. 29, 2006

(54) LIFM ALGORITHM FOR SECURITY ASSOCIATION DATABASE LOOKUP IN IPSEC APPLICATION

(75) Inventors: Fang-cheng Liu, Hsinchu (TW); Ding-jyan Syu, Hsinchu (TW)

(73) Assignee: ADMtek Incorporated, (TW)

( * ) Notice: Subject to any disclaimer, the term of this patent is extended or adjusted under 35 U.S.C. 154(b) by 746 days.

(21) Appl. No.: 10/126,179

(22) Filed: Apr. 19, 2002

(65) Prior Publication Data

US 2003/0126428 A1 Jul. 3, 2003

(30) Foreign Application Priority Data

Dec. 28, 2001 (TW) .............................. 90133483 A (51) Int. Cl.
*H04L 9/00* (2006.01)

(52) U.S. Cl. .................. 713/151; 713/152; 380/28; 380/29; 380/30

(58) Field of Classification Search ............ 380/28–30; 726/13; 711/206; 707/101; 713/151–152, 713/160, 189–190
See application file for complete search history.

(56) References Cited

U.S. PATENT DOCUMENTS

| 6,061,449 A * | 5/2000 | Candelore et al. ............ 380/28 |
| 6,157,995 A * | 12/2000 | Asato ........................... 712/25 |
| 6,480,950 B1 * | 11/2002 | Lyubashevskiy et al. ... 711/206 |
| 6,754,662 B1 * | 6/2004 | Li ............................... 707/101 |
| 6,772,348 B1 * | 8/2004 | Ye ................................ 726/13 |

* cited by examiner

*Primary Examiner*—Kim Vu
*Assistant Examiner*—Baotran N. To
(74) *Attorney, Agent, or Firm*—Martine Penilla & Gencarella, LLP (57) ABSTRACT

Current applications used in security system for encryption/decryption/authentication require intense CPU computation for an SAD search. Therefore, a part of the SAD is planted into an ASIC in order to lessen the load of the CPU.

The invention provides a high-performance lookup method that is "LIFM" adapted to the ASIC. Initially, the ASIC makes a perfect match by comparing the SAD_index field of all items allocated in the ASIC with an incoming packet to fetch the required SAD_key. If there is no match, the software and hardware are started by issuing an interrupt from the ASIC until the CPU finds a perfectly matched item. Then, the software level updates the perfectly matched item in the ASIC.

1 Claim, 9 Drawing Sheets

| 0 | SAD_index (161 bits) | SAD_key (64 Bytes) |
|---|---|---|
| 1 | (1) D-IP : Destination IP address<br>(2) IPP : IPSec protocol : AH :1/ESP :0<br>(3) SPI : Security Parameter Index | (1) encryption keys,<br>(2) authentication Keys |
| 2 | | |
| ⋮ | | |
| | | |
| M | | |

LIFM ALGORITHM FOR SECURITY ASSOCIATION DATABASE LOOKUP IN IPSEC APPLICATION

BACKGROUND OF THE INVENTION

1. Field of the Invention

The invention relates to a lookup method combining hardware with software and used in association databases. The invention applies to IPSEC(IP Security/RFC 2401) to accelerate the search for the correct key.

2. Description of the Related Art

There are two current technologies to deal with the SAD (Security Association Database) lookup method implemented by an ASIC (Application Specific Integrated Circuit) in an IPSEC (IP Security/RFC 2401) NIC (Network Interface Card). One such method is the "Hash Lookup" method while the other is the "Perfect Match Lookup" method.

These two technologies provide various methods for searching for a required key in an SAD to decrypt an incoming encrypted packet in a VPN (Virtual Private Network) environment.

While a complete SAD is located in the software level, a part of the SAD is maintained in the ASIC (i.e. an ASIC-SAD is a subset of a software-SAD). This principle lets the ASIC analyze the incoming packet and find the key the very first time. It is best if all of the possibly matched keys are located in the ASIC, and can be easily found by the ASIC without using the CPU. If such SAD arrangements and key search methods are not good enough, then the CPU must be used to search for the required key in the software level and the CPU must also update the ASIC-SAD. Thus, how to effectively search for the required key in the ASIC-SAD by the ASIC is a very important factor in improving the overall networking processing performance.

Figure 1:
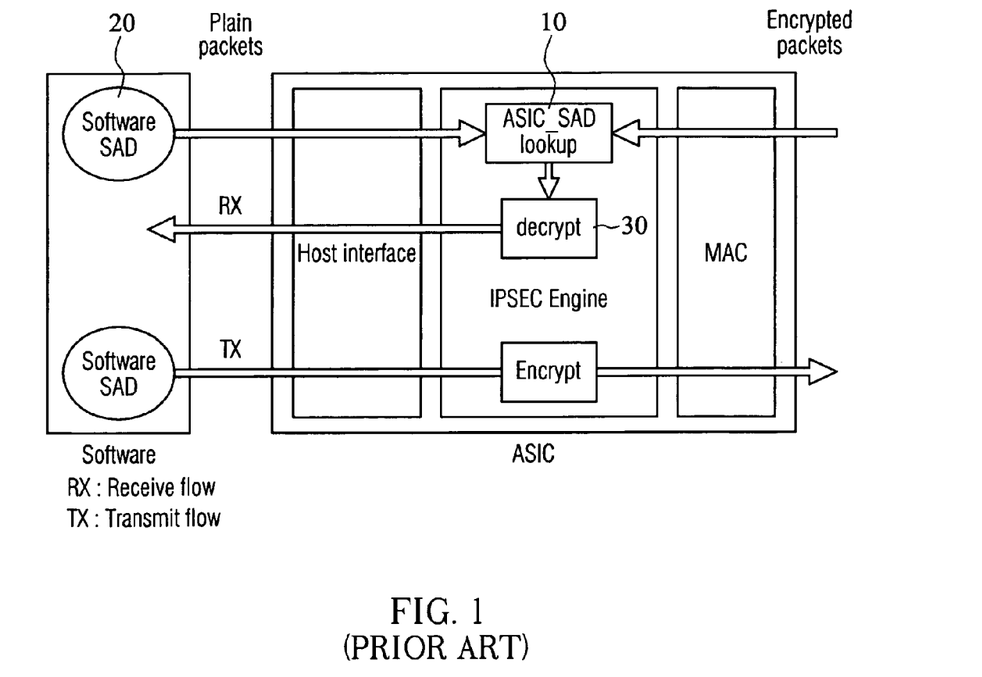
FIG. 1 is a block diagram showing the SAD architecture.

FIG. 1 is a block diagram of the SAD architecture. An incoming encrypted packet enters the ASIC, then the ASIC searches for the required key in the ASIC_SAD lookup section 10. If unsuccessful, the incoming encrypted packet is decrypted in the decryption section 30 after the required key is found with the help of a software_SAD 20.

Figure 2:
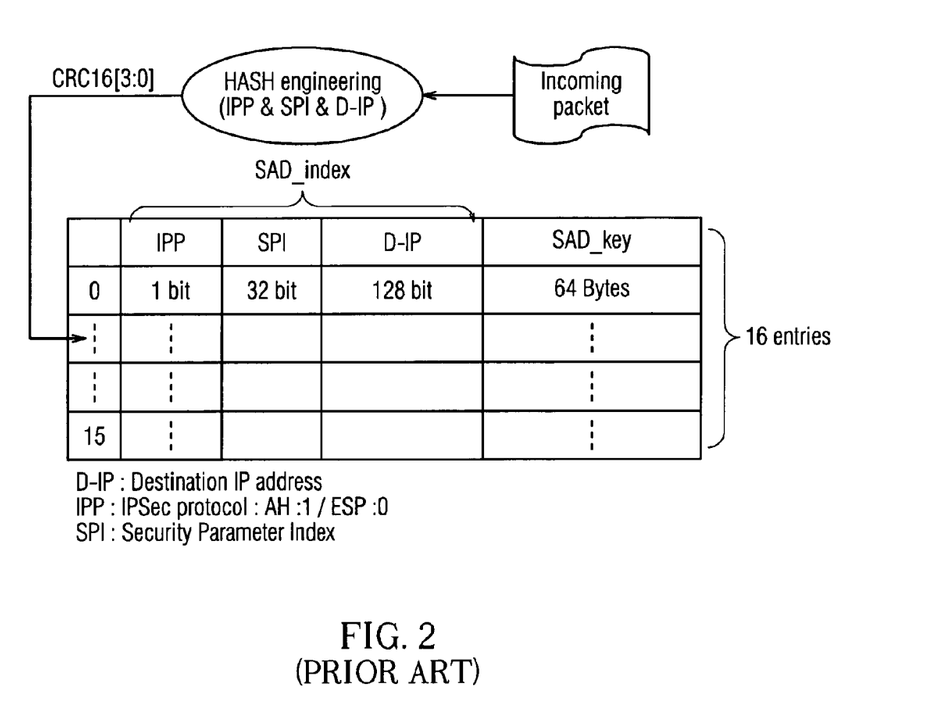
FIG. 2 is a schematic diagram showing an example of the Hash Lookup.

A detailed explanation concerning "Hash Lookup" and "Perfect Match Lookup" will be next given as follows:

(1) Hash Lookup: This method calculates the 16-bit CRC (Cyclic Redundancy Code, named CRC16) of three specified items, which are D-IP (Destination IP address), IPP (IPSEC protocol) and SPI (Security Parameter Index) inside the encrypted packet, and the ASIC uses the CRC 16[x:0] as a pointer to perfectly match this item in the SAD (x=4, if the SAD totally has 16 items) as shown in FIG. 2 (i.e. each bit is compared; if the total bits of SAD_index are equal to 161, then the comparison is made 161 times).

If the SAD_index inside the pointed item that is called "bingo" is "perfectly matched" with D-IP, IPP and SPI, then the SAD_key of this item is the required key that can decrypt the encrypted incoming packet.

Figure 3:
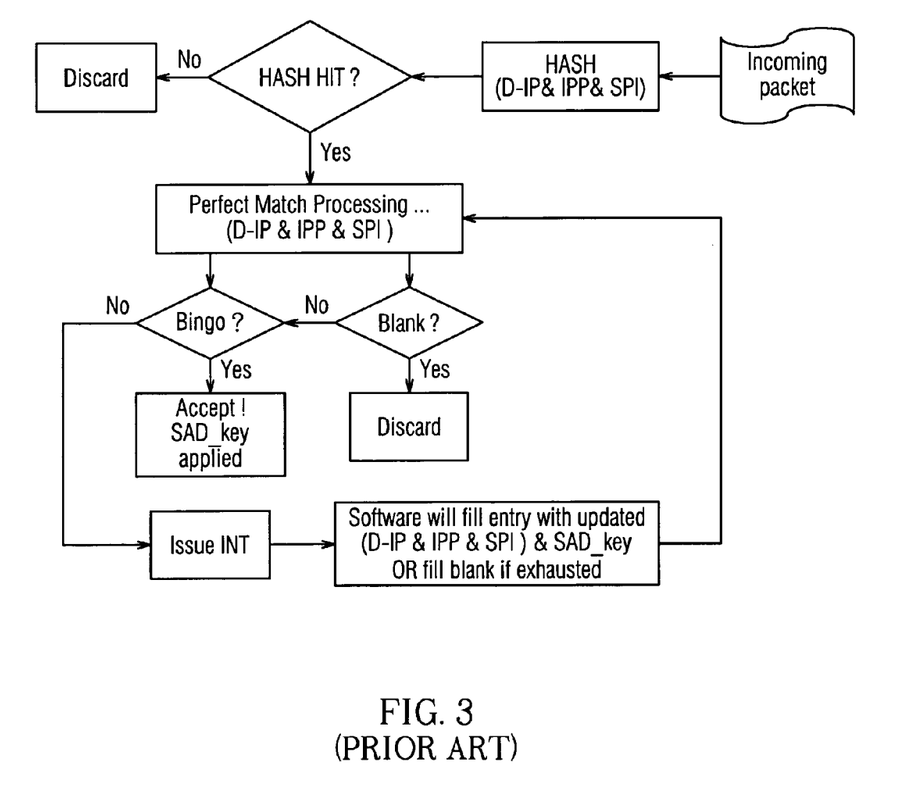
FIG. 3 is a flow chart showing the Hash Lookup algorithm.

If the item inside ASIC is not "bingo", then the software level updates the "bingo" item in ASIC. The algorithm is detailed as seen in FIG. 3.

The drawback of Hash Lookup is the "Hashing Hazard" problem. That is, two incoming packets with the same CRC16[x:0] require the software to update this "bingo" item frequently. For example, a packet 1 has the same CRC16 [x:0] with a packet 2, but actually these 2 packets do not have the same SAD_index. If these 2 packets often arrive, then it causes the software level to update the "bingo" item quite frequently, which in turn lowers the overall performance of this system.

Figure 4:
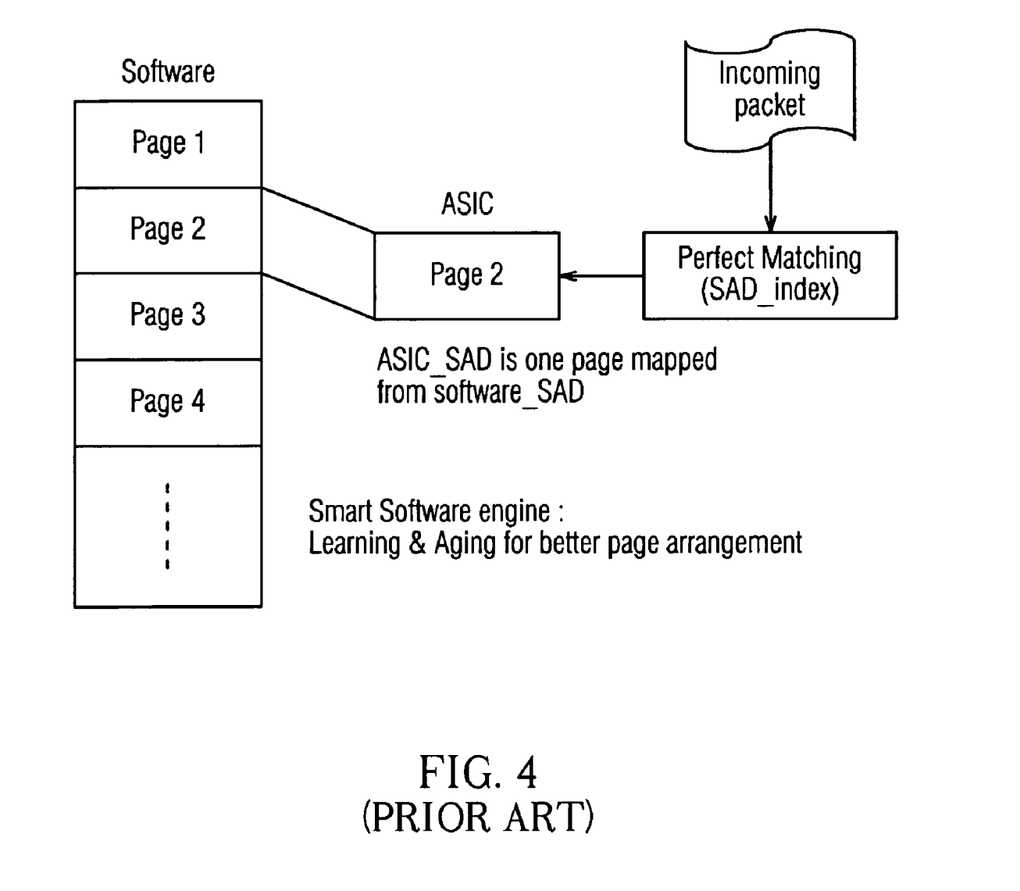
FIG. 4 is a schematic diagram showing the Perfect Match Lookup architecture.

(2) Perfect Match Lookup: As shown in FIG. 4, the principle is to maintain a page in the ASIC, and this page is mapped to one of several pages in the software level. This method uses the 3 specified items (D-IP, IPP and SPI) within the encrypted packet to perfectly match those SAD_indexes inside SAD.

Figure 5:
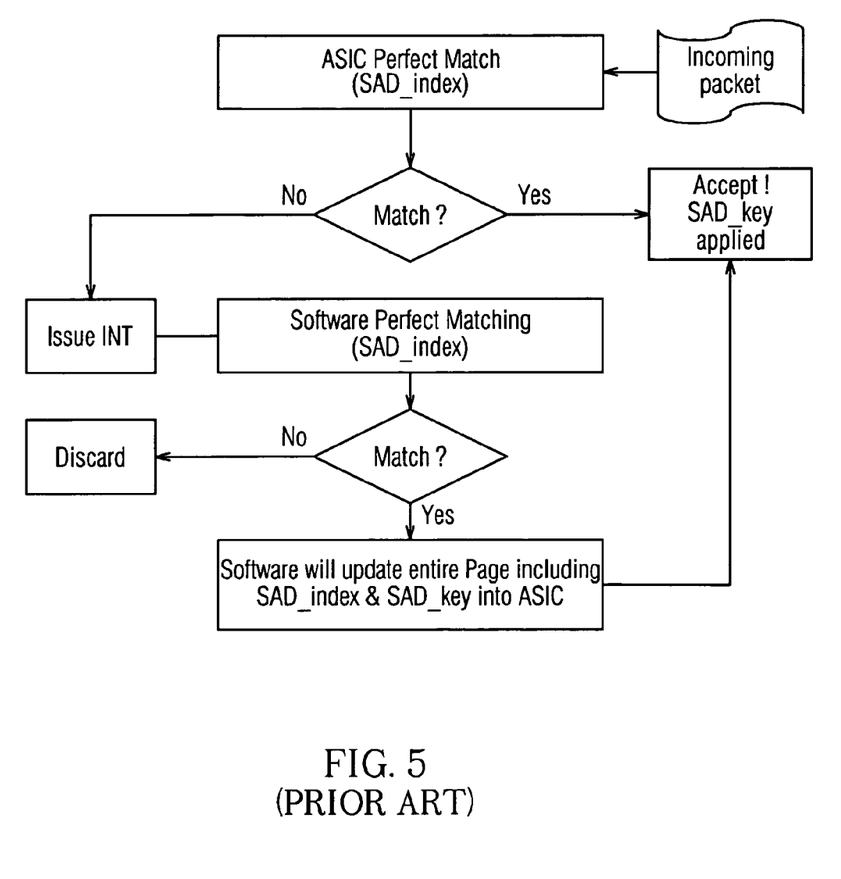
FIG. 5 is a flow chart showing the Perfect Match Lookup algorithm.

As illustrated in FIG. 5, the ASIC tries to perfectly match all items inside the ASIC_SAD. If the ASIC cannot find a match then the ASIC issues an interrupt to the software level that updates the ASIC_SAD inside the ASIC. This method requires a "smart software" to arrange a highly possible page for the ASIC; if this page is properly arranged, then the ASIC is easily "bingo".

The method needs a very intelligent smart-software to arrange the "easy bingo page" in the ASIC. If some conditions are beyond the control of the software, it may cause the software to update the whole page in the ASIC frequently.

Updating the whole page in the ASIC costs the CPU lots of time if the coming encrypted packet is not "bingo" in the ASIC; therefore, the overall system performance is easily degraded.

SUMMARY OF THE INVENTION

Due to the two aforementioned problems of the prior art, it is the primary object of the invention to provide an efficient lookup method to apply to the SAD in IPSEC so as to speed up the search for the required keys during processing encrypted packets. The invention not only applies to the IPSEC NIC but also to any encryption/authentication security application that tries to coordinate software together with hardware.

The method of the invention is fully detailed as follows. A complete SAD stored in the software level is handled by a CPU, and a part of the SAD includes M+1 (M is a positive integer) items of data in which every item comprises two fields i.e. an SAD_index and an SAD_key; the M+1 items of data are allocated in ASIC in numerical order (from item 0 to item M). The lookup method includes the following steps:

(1) Receive an incoming packet;

(2) Assign a default value "0" to a variable i;

(3) The ASIC compares the packet with the SAD_index field of item i, if perfectly matched, then jump to step 6;

(4) Identify whether the numerical value of the variable i is equal to M, if "YES", then jump to step 7;

(5) Set the numerical value of the variable i to equal the previous value plus 1, then return to step 3;

(6) Read out the SAD_index field of item i, and store the data of item i in an intermediate storage. Then moves respective items (i−1), (i−2) . . . , 1, 0 to locations i, (i−1), . . . 2, 1 in sequence. Finally, move the data stored in an intermediate storage to location 0 and jump to step 9;

(7) The ASIC issues an interrupt to inform the CPU. After receiving the interrupt, the CPU enters the aforementioned software level and successively compares each item being allocated in the software level with the aforementioned packet in terms of each bit of the SAD_index field until the CPU finds the perfectly matched item.

(8) Read out the SAD_index field of the aforementioned item that makes a perfect match with the packet, then respectively move items (M−1), (M−2) . . . , 1, 0 to locations M, (M−1), . . . 2, 1 in sequence. Finally, move the aforementioned item that makes a perfect match with the packet to location 0;

(9) End.

DESCRIPTION OF THE PREFERRED EMBODIMENTS

Figure 6:
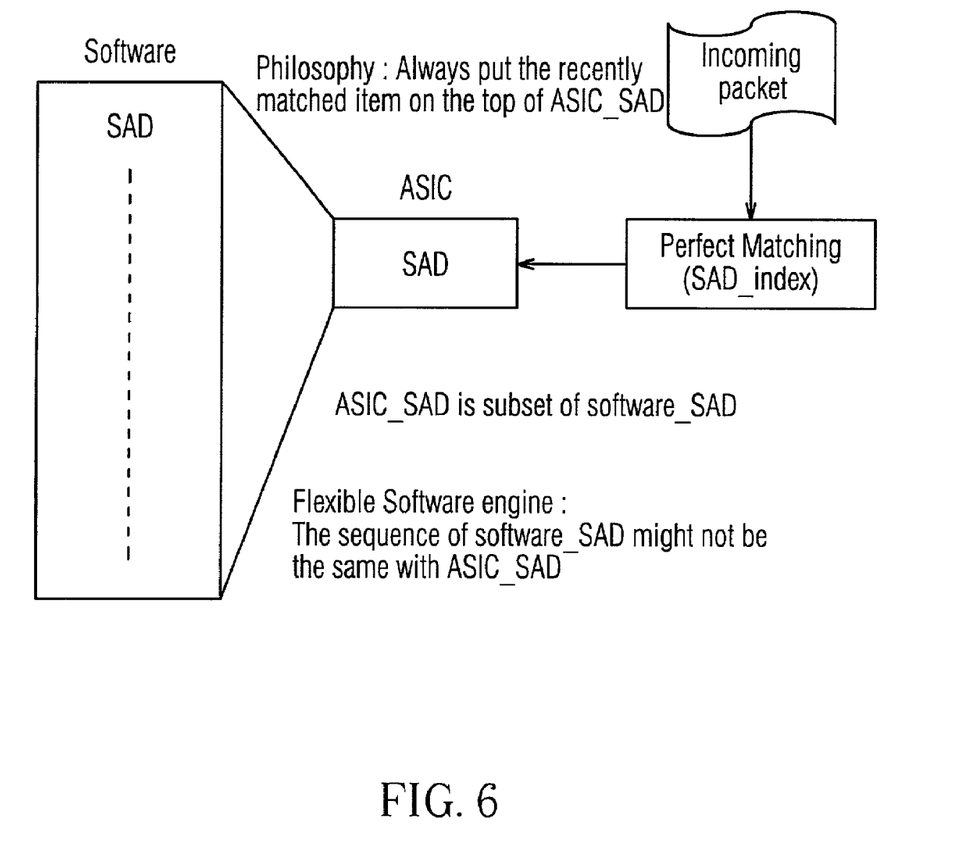
FIG. 6 is a schematic diagram showing the LIFM architecture.

FIG. 6 illustrates a schematic diagram of the LIFM architecture.

Figure 7:
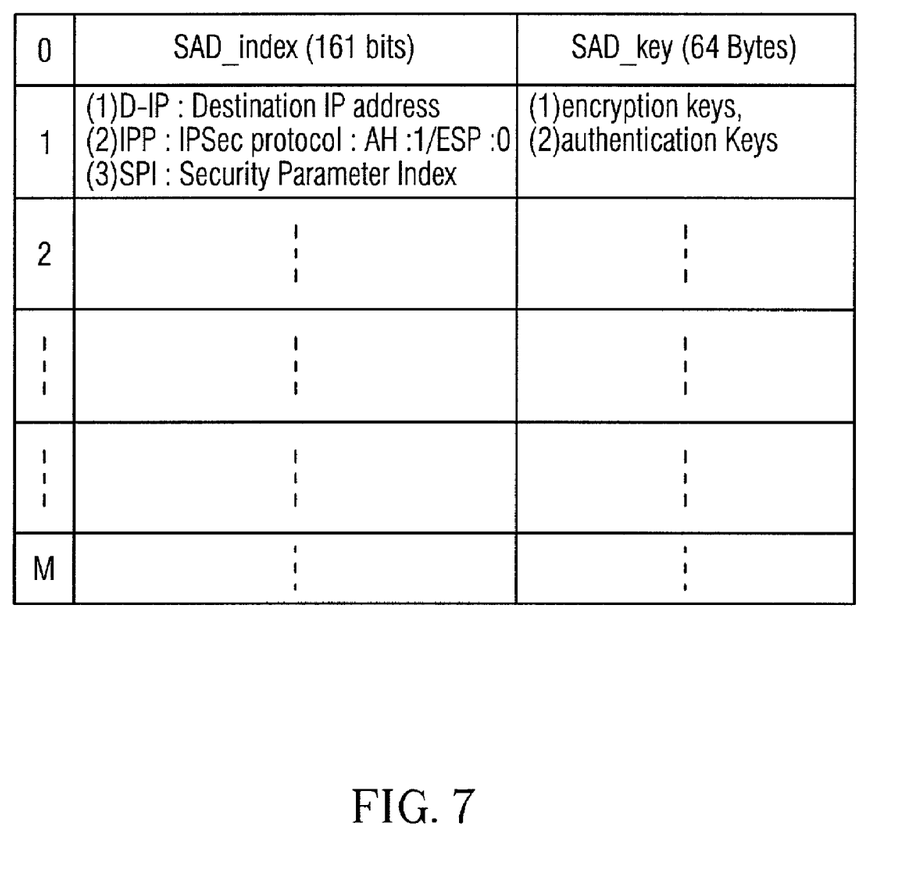
FIG. 7 is a schematic diagram showing the SAD.

The LIFM (Last In First Match) algorithm is perfectly suitable for processing incoming packets in an ASIC in TCP/IP IPSEC encrypted security channel in a VPN (Virtual Private Network) environment. The LIFM uses some specified fields inside the coming packet to make a perfect match with the SAD_indexes of all items within database. The database (SAD) format can be referenced in FIG. 7.

Figure 8:
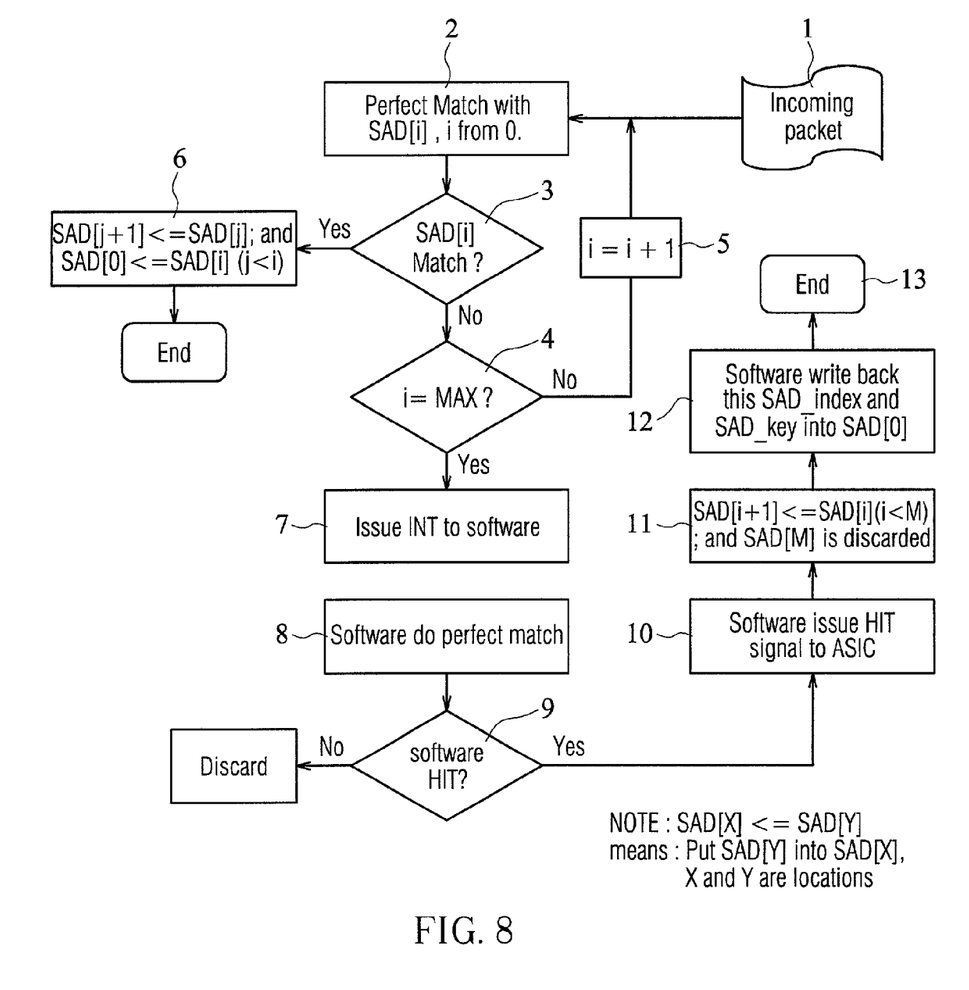
FIG. 8 is a flow chart showing the LIFM algorithm.

A flowchart of the LIFM algorithm is shown in FIG. 8, which includes the following steps:

(1) Receive an incoming packet;

(2) Assign a default value "0" to a variable i;

(3) The ASIC compares the packet with the SAD_index field of item i, if perfectly matched, then jump to step 6;

(4) Identify whether the numerical value of the variable i is equal to M, if "YES", then jump to step 7;

(5) Set the numerical value of the variable i to equal the previous value plus 1, then return to step 3;

(6) Read out the SAD_index field of item i, and store the data of item i in an intermediate storage. Then move respective items (i–1), (i–2) . . . , 1, 0 to locations i, (i–1), . . . 2, 1 in sequence. Finally, move the data stored in an intermediate storage to location 0 and jump to step 13;

(7) The ASIC issues an interrupt to inform the CPU;

(8) After receiving the interrupt, the CPU enters the aforementioned software level and successively compares each item being allocated in the software level with the aforementioned packet in terms of each bit of the SAD_index field;

(9) It goes on until the CPU finds the perfectly matched item, if fails, then the packet is discarded;

(10) Read out the SAD_index field of the aforementioned item that makes a perfect match with the packet. Then, the software generates a match signal to the ASIC;

(11) Respectively, move items (M–1), (M–2) . . . , 1, 0 to locations M, (M–1), . . . 2, 1 in sequence and discard item M;

(12) Finally, move the aforementioned item that makes a perfect match with the packet to location 0;

(13) End.

Figure 9:
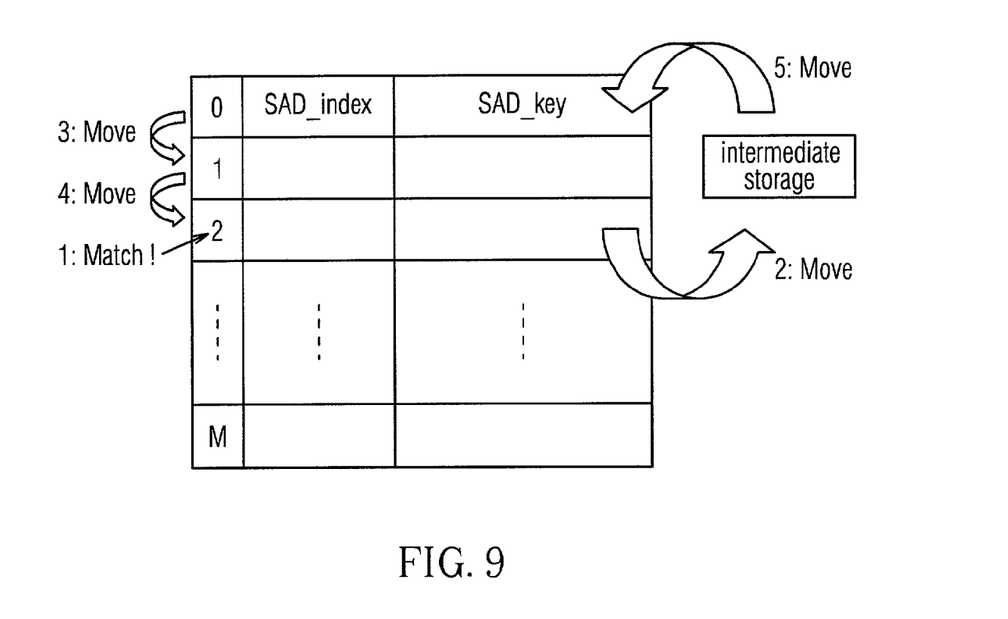
FIG. 9 is a schematic diagram showing a matched item being found in the ASIC_SAD.
Figure 10:
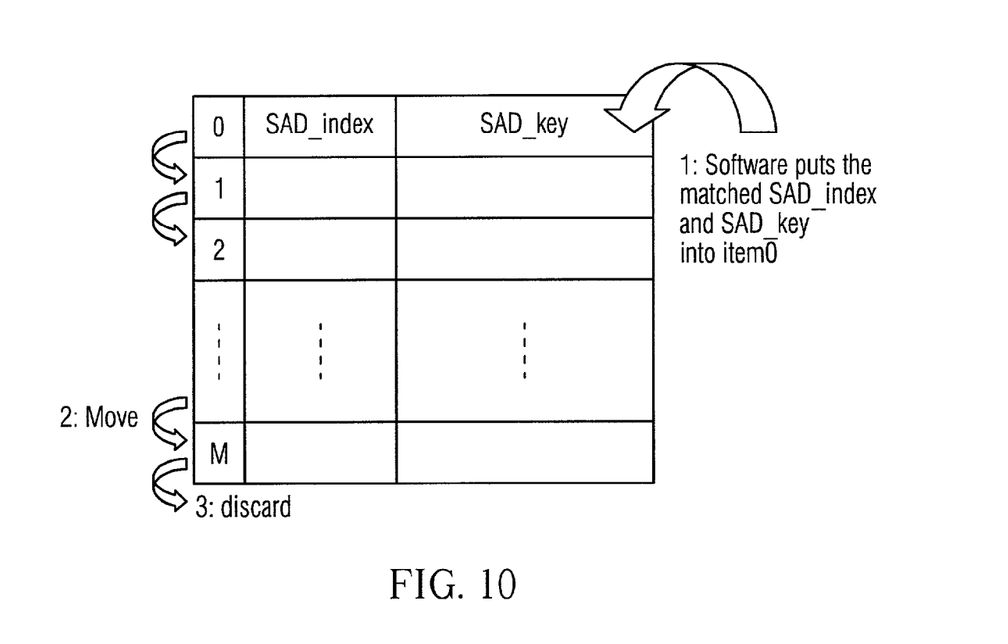
FIG. 10 is a schematic diagram showing no matched item being found in the ASIC_SAD.

According to the above-mentioned LIFM algorithm, FIG. 9 shows a schematic diagram of a matched item found in the ASIC_SAD and FIG. 10 describes a schematic diagram of no matched item being found in the ASIC_SAD.

In accordance with the flow chart of the algorithm shown in FIG. 8, FIG. 9 shows an exemplarily matched item and the ASIC will subsequently execute the following operations: (1) Move item 2 (SAD_index and SAD_key) to an intermediate storage; (2) Move item 1 to item 2, item 0 to item 1; (3) Finally, move the content of the intermediate storage to item 0.

An example shown in FIG. 10 describes that no item is matched. According to FIG. 8, the ASIC issues an interrupt that informs the CPU to make a perfect match within the software_SAD and then update the matched item in location 0 of the ASIC. Before updating the ASIC, all items in the ASIC are shifted to the next location successively, and the last item M is discarded.

This LIFM algorithm is a brand new SAD architecture with an efficient method to look up the required SAD_key for the IPSEC encrypted packet processing. The ASIC_SAD is a subset of the software_SAD, and the sequence of items in the software_SAD may not be the same with those in the ASIC_SAD, which, as a result, reduces the operational load of the CPU.

The LIFM starts searching from the location 0 (at the top of the SAD) and stops when a certain item is matched. The invention puts this just matched item at the top of the SAD; therefore, the most recently matched item is located at the top, and all of the successive items are shifted to the subsequent position.

The IPSEC NIC is the best environment to be implemented with the LIFM alogorithm. If one SAD_index is matched, then the IPSEC NIC fetches the related SAD_key corresponding to the SAD_index to do some decryption tasks.

A part of the IPSEC task is embedded in the ASIC, which has a better performance than those NICs which rely on the CPU to do the encryption/decryption/SAD lookup jobs.

This LIFM algorithm can be easily implemented in the ASIC and performs very efficiently in searching for the required content (SAD_key) which the encrypted packet needs. Once the content (SAD_key) is found, the ASIC starts decrypting the encrypted packet. The sooner the SAD_key is found, the faster the packet is decrypted to plain-text; thus being equipped with an efficient lookup method is very important for the IPSEC NIC.

The required SAD_key is fetched according to the LIFM algorithm if three important factors inside the incoming packet "D-IP, IPP and SPI" are "perfectly matched" to the "SAD_index".

The LIFM algorithm helps the ASIC to get the required key on the very first try when the encrypted packet is coming into the TCP/IP networking environment with a VPN setting. The packet processing time (the latency time) is greatly reduced and the overall networking traffic performance is significantly improved.

Since the software_SAD does not need to be synchronized with the ASIC_SAD (i.e. the sequence of all items in the software_SAD may not be the same with the ASIC_SAD), the software_SAD is only launched when the ASIC_SAD lookup fails, so the load of the CPU in maintaining the SAD is small.

What is claimed is:

1. A lookup method applied to an SAD in an IPSEC, wherein a complete SAD stored in a software level is handled by a CPU and a part of the SAD includes M+1 (M is a positive integer) items of data in which every item comprises an SAD_index field and an SAD_key field, the M+1 items of data are allocated in an ASIC in numerical order (from item 0 to item M), the lookup method comprising the following steps:

(1) receiving an incoming packet;
(2) assigning a default value "0" to a variable i;
(3) using the ASIC to compare the packet with the SAD_index field of item i, if perfectly matched, then jumping to step 6;
(4) identifying whether the numerical value of the variable i is equal to M, if "YES", then jumping to step 7;
(5) setting the numerical value of the variable i to equal the previous value plus 1, then returning to step 3;
(6) reading out the SAD_index field of item i, and storing the data of item i in an intermediate storage, then moving respective items (i−1), (i−2) . . . , 1, 0 to locations i, (i−1), . . . 2, 1 in sequence, and finally, moving the data stored in an intermediate storage to location 0 and jumping to step 9;
(7) using the ASIC to issue an interrupt to inform the CPU, and after receiving the interrupt, the CPU entering the aforementioned software level and successively comparing each item being allocated in the software level with the aforementioned packet in terms of each bit of the SAD_index field until the CPU finds the perfectly matched item;
(8) reading out the SAD_index field of the aforementioned item that makes a perfect match with the packet, then respectively moving items (M−1), (M−2) . . . , 1, 0 to locations M, (M−1), . . . 2, 1 in sequence, and finally, moving the aforementioned item that makes a perfect match with the packet to location 0; and
(9) ending.

* * * * *